United States Patent [19]
Clark

[11] 4,109,544
[45] Aug. 29, 1978

[54] V-BELT MANIPULATING TOOL
[75] Inventor: Robert E. Clark, Minneapolis, Minn.
[73] Assignee: Thexton Manufacturing Company, Minneapolis, Minn.
[21] Appl. No.: 774,452
[22] Filed: Mar. 4, 1977
[51] Int. Cl.² .............................................. F16H 7/08
[52] U.S. Cl. .................................................. 74/242.7
[58] Field of Search ........................... 24/242.6, 242.7
[56] References Cited

U.S. PATENT DOCUMENTS

| | | | |
|---|---|---|---|
| 2,195,359 | 3/1940 | Coe et al. | 74/242.7 |
| 2,505,216 | 4/1950 | Simmons et al. | 74/242.7 |
| 2,615,345 | 10/1952 | Ross | 74/242.7 |
| 2,621,529 | 12/1952 | Hawkins | 74/242.7 |
| 2,924,109 | 2/1960 | Carriveau | 74/242.7 |

*Primary Examiner*—Leonard H. Gerin
*Attorney, Agent, or Firm*—H. Dale Palmatier

[57] ABSTRACT

A V-belt manipulating tool including an elongate rubber-like base having a V-shaped clip at one end to stabilize the tool in the pulley groove, there being upstanding rigid ears on the metal clip for manipulating the V-belt, the tool also having an upstanding lug at the opposite end with an oblique camming face at one side to guide and direct the V-belt off to the side of the pulley in removing the belt from the pulley.

14 Claims, 11 Drawing Figures

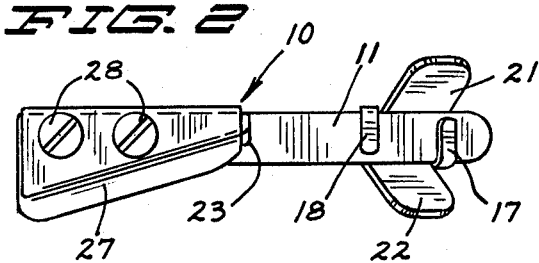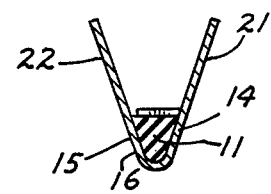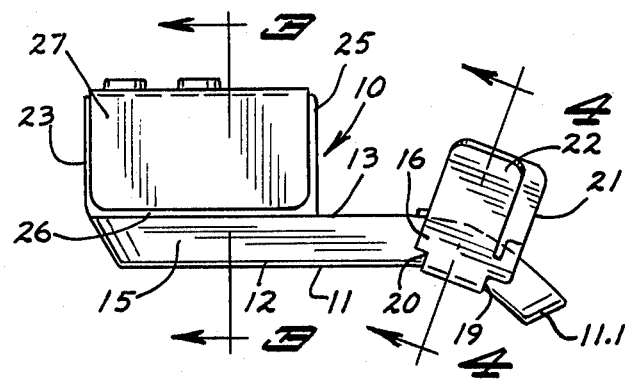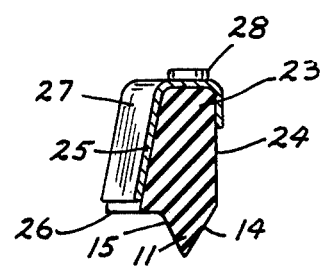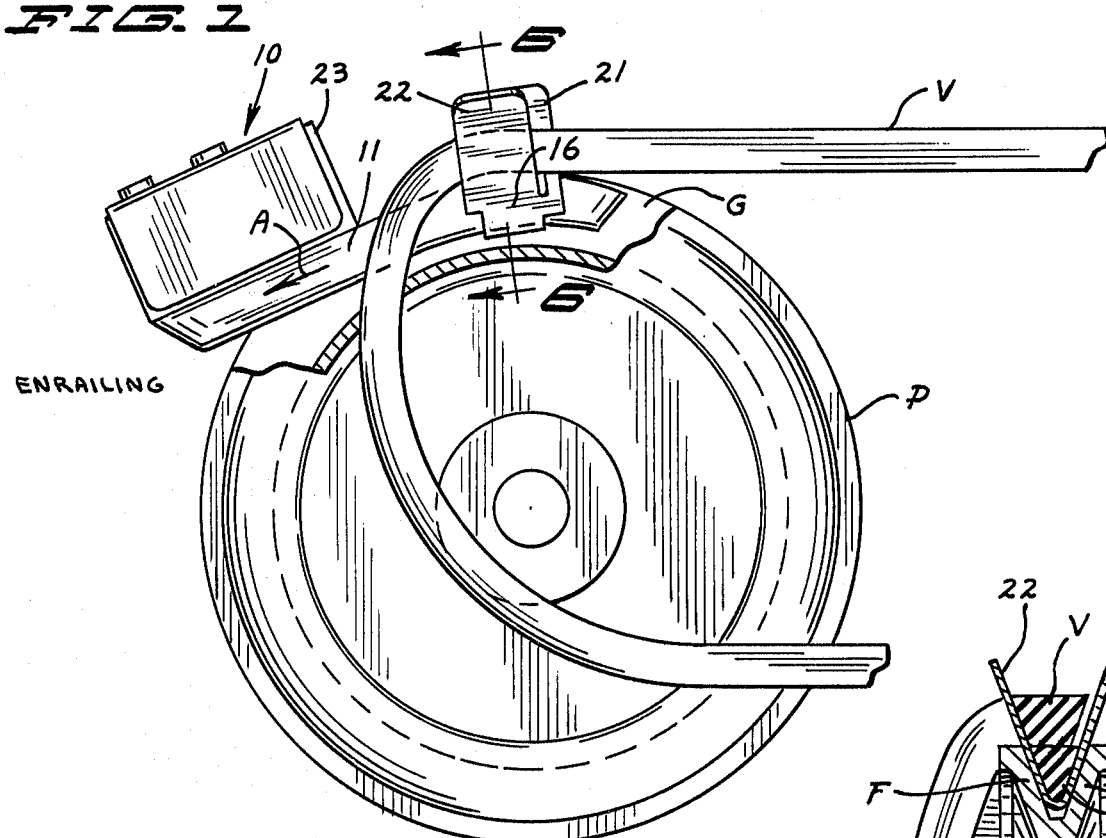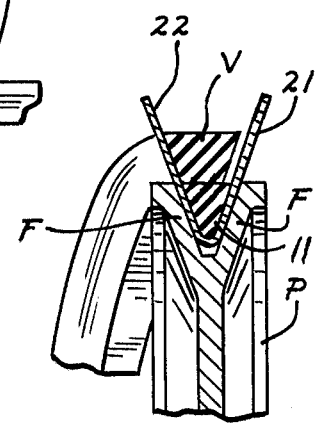

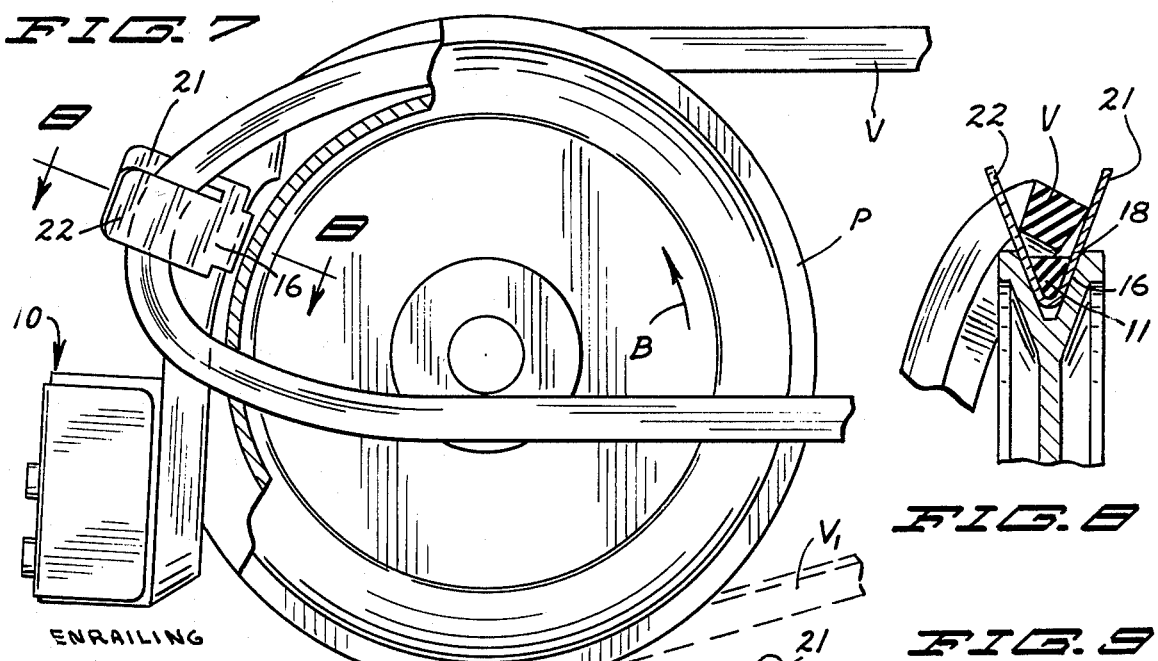
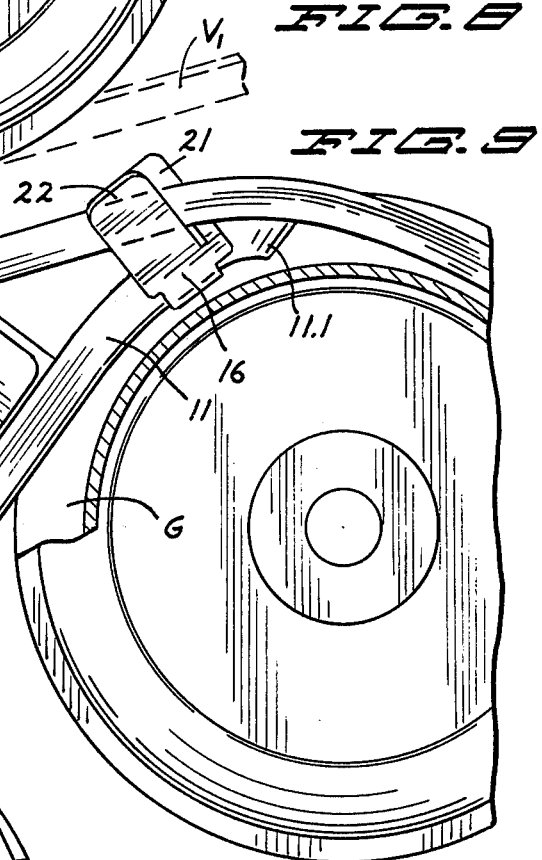
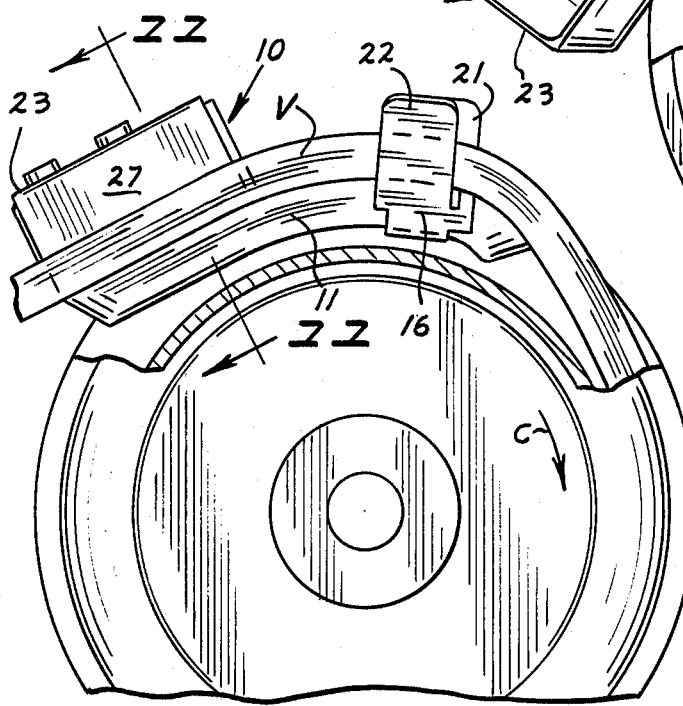
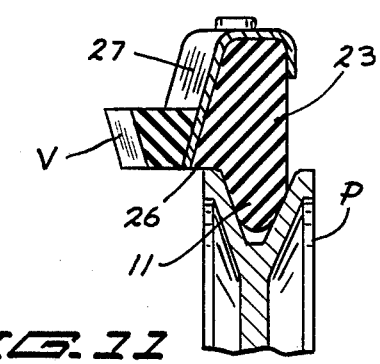

V-BELT MANIPULATING TOOL

This invention relates to a device for manipulating a V-belt relative to a grooved pulley for removing such belt from the pulley and also to apply the belt to a grooved pulley.

BACKGROUND OF THE INVENTION

Modern engines, such as automobile engines and other engines used to drive various vehicles, make prolific use of V-belts. Oftentimes the spaces near the pulleys and V-belts are obstructed with other equipment making manipulation of the V-belts very difficult in applying and removing the V-belts relative to the pulleys.

Generally, but not always, V-belts will embrace three pulleys, but, in some instances, only two pulleys are confined within the runs of a V-belt; and in other instances long V-belts may pass over four or six or more pulleys. The sizes of these various pulleys varies considerably, and in some instances the V-belts will be only two inches in diameter, and in other instances the pulleys may be six or eight inches in diameter, all depending upon the rotary shaft speeds that are employed in the drives and auxiliary devices.

It is commonplace to use stacked pulleys, or multiple groove pulleys for driving numerous belts from a single drive shaft. In somes instances, in order to remove the belts, it is necessary to first remove the outside belt, and then move the other stacked belts from one groove to another and then ultimately off the end or side of the pulley. Application of belts to the correct groove in these stacked pulleys requires considerable belt manipulation.

The cramped quarters adjacent the belt and pulley locations prohibits the use of tools with screwdriver type handles or other large appendages. Accordingly, such prior tools as are illustrated in U.S. Pat. Nos. 2,195,359; 2,505,216; 2,615,345; and 2,621,529, simply cannot be used because of the extremely cramped quarters adjacent such engines and because of the multiplicity of various pulley sizes which must be accommodated. Devices such as illustrated in U.S. Pat. No. 2,924,109, although of a size to be fitted into cramped quarters, are extremely difficult to operate because of the construction thereof, and further, that many different tools must be in the immediate possession of a mechanic who works with V-belts and pulleys of many different sizes.

Such prior art devices as were previously used in connection with flat belts and pulleys which permitted a device to be clamped to the pulley during application or removal of the belt, are simply not practical in quickly manipulating V-belts while servicing modern engines. Modern pulleys simply do not accommodate attachments for manipulating the belt.

SUMMARY OF THE INVENTION

According to the present invention, the outwardly projecting ears are arranged on the rubber flexible base in a manner so that the ears become extremely stable when applied to a V-belt pulley so that the rigid ears will manipulate the V-belt in the manner intended. The belt may be applied to the pulley from either side of the pulley.

In removing a belt from a V-belt pulley, the belt is initially lifted out of the groove as the pulley is revolved slowly and that portion of the belt which is lifted out of the pulley is guided off to the side of the pulley and away from the groove. Although pulleys vary some in size, the tool for removing the belt from the pulley will not get stuck in the pulley or on the belt because as the belt is loosened from the pulley during the removal process, the belt serves to loosen the device from the pulley so that it may drop clear or be easily removed from the pulley.

The shape of the tool permits ready and easy manipulation of the tool, while placing it in the proper position so as to readily manipulate the belt in the proper direction. Although some manual dexterity and strength may be helpful in properly setting the device in the proper position relative to the belt and pulley, the tool permits ready and easy manipulation and without requiring any longhandled protuberances as are commonly known in the prior art.

BRIEF DESCRIPTION OF THE DRAWINGS

FIG. 1 is a side elevation view of the present invention;

FIG. 2 is a top plan view thereof;

FIG. 3 is a detail section view taken approximately at 3—3 in FIG. 1;

FIG. 4 is a detail section view taken approximately at 4—4 in FIG. 1;

FIG. 5 is a schematic view of the tool in assembly with a belt and pulley which is partly broken away for clarity of detail and showing the belt being applied to the pulley;

FIG. 6 is a detail section view taken approximately at 6—6 in FIG. 5;

FIG. 7 is a schematic elevation view similar to FIG. 5, but showing the advanced stage of applying the belt to the pulley, and also showing in dotted lines, the completed position of the belt applied to the pulley;

FIG. 8 is a detail section view taken approximately at 8—8 in FIG. 7;

FIG. 9 is a schematic elevation view of the invention being applied to the belt and pulley for removal of the belt from the pulley;

FIG. 10 is a view similar to FIG. 9 showing the advanced stage of removing the belt from the pulley;

FIG. 11 is a detail section view taken approximately at 11—11 of FIG. 10.

DETAILED SPECIFICATION

One form of the invention is illustrated and described herein.

The V-belt manipulating tool is indicated in general by numeral 10, and includes an elongate base 11 of rubber-like elastomeric material, and it has been found that a material known as 60 durometer neoprene has proven to be satisfactory. The base 11 has a cross-sectional shape and size as to fit into the V-shaped groove G of a V-belt pulley P which has divergent flanges F which define the groove.

The base 11 of the tool has an inner side 12 to lie in the bottom of the groove G of the pulley, and an outer side 13 which will normally lie adjacent the peripheral edges of the flanges F of the pulley. The base 11 has a tapered transverse shape and defines substantially flat side faces 14 and 15 which converge toward each other adjacent the inner side 12 of the base and conform substantially to the tapered shape of the pulley flanges F at the sides of the groove. Because of the shape of the base 11, and the rubber-like material thereof, a limited inward pressure on the base 11 toward the pulley produces a significant frictional adherence between the base 11 and the surfaces of the flanges F so as to prevent any slipping of the base 11 and tool 10 along the pulley groove.

A rigid fitting or metal clip 16 is affixed to one end portion of the base 11, but in spaced relation with the terminal end 11.1 thereof so that portions of the base 11 extend longitudinally endwise in both directions from the clip 16. The clip 16 embraces the outer periphery of the base 11 and conforms substantially to the shape thereof as illustrated in FIG. 4 so as to also lie flush against both side surfaces of the pulley flanges F adjacent the groove. The clip 16 is seen to have a tapered shape, and is rather sharply bent back upon itself to define an apex adjacent the inner side 12 of the base. The clip 16 is clamped to the base 11 by a pair of clamping fingers 17 and 18 which overlie the outer side of the base and clamp the rubber-like base in tight fitting relation. Inwardly of the fingers 17 and 18, and at each end of the clip 16, the clip has notches 19 and 20 which cooperate with the clamping fingers 17 and 18 to preset a permanent bend in the base 11 so that the base 11 inherently is contoured, roughly, to the shape of the peripheral curvature of the pulley. The portions of the base adjacent both ends of the clip 16 will instantly engage the faces of the pulley flanges F whenever the tool 10 is inserted into the pulley groove.

Preferably the fitting or clip 16 is of rigid metal so that the clip, taken together with the base 11 which passes through it and the rigid fingers 17 and 18 cooperate to raise or lift the V-belt V out of the groove, in the manner indicated in FIG. 9. It has been found successful to form the rigid clip from 16 gauge (0.0600 inches thickness) hot rolled pickled and oiled mild steel.

A pair of outwardly projecting rigid ears 21 and 22 are formed integrally with and of clip 16. The ears 21 and 22 extend outwardly from the outer side 13 of the base 11 and extend at an oblique angle with the top surface of the base so that the ears extend transversely outwardly toward the sides of the pulley P, in the manner illustrated in FIG. 6. It is important that the ears 21 and 22 diverge from each other in a direction away from the base 11 so that each of the ears will extend transversely outwardly beyond the respective side of the pulley P.

In some instances, it may be desirable to orient the ears 21 and 22 at the same angular orientation as are the sides 14 and 15 of the base 11, and in other instances, it may be desirable to orient the ears 21 and 22 obliquely outwardly at a distinctly greater angle than the side faces 14 and 15 of the base so as to more pronouncedly extend transversely to the sides of the pulley.

The belt manipulating tool 10 also includes an upstanding and substantially rigid lug 23 formed integrally of and in one piece with the base 11. The upright lug 23 protrudes upwardly or outwardly from the top or outer side of the base 11 a distance approximately twice the depth or thickness of the base between the inner and outer sides thereof. The lug 23 is seen to extend generally longitudinally of the base 11, and one side 24 of the lug lies substantially flush with and parallel to the corresponding side of the base 11. The other side 25 of the lug 23 lies at an oblique angle with respect to the longitudinal orientation of base 11 so that the side 25 obliquely confronts the forward portion of the base 11 and the clip 16 and the ears thereon. It will be seen in FIG. 2, that the forward portion of the oblique side of the lug 23 is disposed intermediate the width of the base 11, and the rear portion of the oblique side of the lug 23 extends significantly upwardly beyond the side of the base. The lug 23 also has a downwardly facing ledge 26 at one side of the base 11 and beneath the oblique side 25 thereof. The ledge 26 will, in most cases, engage and be supported by the outer peripheral edge of the pulley flange substantially as illustrated in FIG. 11.

The lug is also provided with a metal plate 27 which overlies the oblique side 25 thereof and defines a smooth camming face on the side of the lug. The metal plate 27 is supported on the top face of the lug 23 and is affixed thereon as by screws 28.

In the operation of the tool 10, attention is first invited to FIGS. 5 – 8 which illustrate the steps in applying the V-belt V to the pulley P. Initially, the base 11 of the tool is laid in the groove G of the pulley with the ears 21 and 22 cradling and embracing the belt V. In the position of FIG. 5, the ear 22 extends outwardly somewhat beyond the side of the pulley so that the belt is conveniently carried with the upper portion of the belt substantially in alignment with the groove G and the return portion of the belt lying to the side of the pulley. From this initial position illustrated in FIG. 5, the tool 10 must be moved around the pulley P, in the direction of arrow A, and substantially to the position illustrated in FIG. 7. In order to move the tool 10 from the initial position to the position of FIG. 7, the upstanding lug 23 is manually gripped and the tool 10 is caused to slide in the groove G so that the ear 22 almost reaches the halfway location around the periphery of the pulley. In this position of FIG. 7, the belt V is as tight as can reasonably be accomplished by manual pressure exerted on the tool 10. At this time, there is a significant inward pressure exerted by the belt V onto the base 11 and the frictional relation between the faces of the rubber base 11 and the metal flanges F of the pulley prevent the tool 10 from slipping in either direction in the groove of the pulley. The metal clip 16 bears firmly against both side faces of the groove and the grip 16 conforms to the shape of the groove of the pulley so that there is essentially no tendency of the clip 16 to tip to the side of the pulley. From the initial position illustrated in FIG. 5, wherein the tension on the belt V is minimal, and wherein the belt is symmetrically oriented between the ears 21 and 22, as illustrated in FIG. 6, the tension on the belt is materially increased in the position of FIG. 7, and in this position, the belt is tilted slightly relative to the clip 16 and relative to the ears 21 and 22 with the result that the belt bears firmly against both of the ears 21 and 22 with the result that inward pressure toward the center of the pulley is exerted by the belt on both of the ears 21 and 22 and also the rigid fingers 17 and 18 as well as the top face of the base 11. It is important at this stage that the belt V bears inwardly toward the pulley against the ear 21, although the belt actually extends off to the other side of the pulley opposite the ear 21. This inward pressure on both ears, as well as the base 11 and fingers 17 and 18 prevents the tool 10 from tipping off to the side of the pulley as the tension materially increases in the belt.

When the tool 10 has reached the position of FIGS. 7 and 8, the mechanic will entirely remove his hands from any further manipulation of the tool 10 in the application of the belt to the pulley. Power is then applied to the pulley from its shaft and the pulley is moved incrementally so as to slowly move the tool 10 around the pulley in the direction of the arrow B. The tool 10 and ear 22 will simply carry the belt V around the pulley as the pulley slowly revolves until the belt is properly in the groove around the necessary portion of the pulley periphery. The tool 10 will move away from the pulley P approximately at the location from which the return run V₁ of the belt emerges and diverges from the pulley.

In the steps of removing a belt from the pulley as illustrated in FIGS. 9 - 11, the end portion 11.1 of the base is initially manually pushed between the belt V and the pulley P so that the base 11 of the tool lies in the groove G and causes the belt to be uplifted away from the bottom of the groove, substantially in the manner indicated in FIG. 10. In order to accomplish the movement of the base 11 and clip 16 to a position beneath the belt V, the mechanic will manually grasp the ears 21 and 22 and in some instances will also press against the lug 23 in order to move the leading end of the tool as far along the groove G as is possible. Preferably, the tool 10 is moved along the groove G until the belt V fully overlies the clip 16 and presses the entire forward portion of the tool firmly against the sidewalls of the pulley groove, as illustrated in FIG. 10. In this position, the side face 27 of the metal plate on lug 23 guides and directs the belt off to the side of the pulley in the manner illustrated in FIG. 11. The sideward pressure of the belt exerted against the lug 23 also causes an inward pressure on the lug 23 toward the pulley so that the base 11 beneath the lug 23 is prevented from tipping in the groove and the lug is thereby retained in upright position. A portion of the inward pressure exerted by the belt on the lug is absorbed at the ledge 26 which bears inwardly against the outer edge of the pulley flange.

When the tool 10 is firmly seated in the groove in the manner illustrated in FIG. 10, power is applied to the pulley P so as to revolve the pulley in the direction of arrow C and the pulley is slowly and incrementally moved as the shaft turns. When the ears 21 and 22 pass the halfway mark or halfway around the pulley, the belt V will soon thereafter substantially freely fall from the pulley and be removed therefrom. As the tension on the belt V is relieved, and the belt tends to fall from the side of the pulley, the belt will slip along the side of ear 22 and tip the ear 22 out of the pulley groove so as to release the entire tool 10 from the pulley.

It will be seen that I have provided a new and improved tool for applying and removing belts on V-grooved pulleys, including a clip with upstanding ears for alternately carrying the belt around the pulley during application of the belt to the pulley and maintaining the rubber base in proper orientation with respect to the pulley and preventing the ears from becoming detached from the pulley. The same clip causes the belt to be uplifted out of the groove in removal of the belt from the pulley, and after the belt is lifted out of the groove, the rigid lug with the oblique camming face on the rear end of the tool causes the belt to be guided off to the side.

What is claimed is:

1. A V-belt manipulating tool for use with tapered grooves of pulleys, comprising
an elongate and flexibly and compressibly resilient base of rubber-like material and having a tapered transverse shape to be received snugly into and follow the contour of the pulley groove, and
an elongate rigid ear on the base and extending outwardly therefrom to engage and manipulate a V-belt, the ear having a rigid mounting clip embracing the exterior of the elongate base and affixed thereto, the clip having a transversely tapered shape conforming to and following the tapered transverse shape of the base to lie flush against the pulley at both sides of the tapered groove of the pulley and minimize tipping of the ear relative to the pulley.

2. The V-belt manipulating tool according to claim 1 and the elongate rubber-like base extending in both directions from said clip to engage and frictionally adhere to the groove-defining surfaces of the pulley.

3. A V-belt manipulating tool for use with tapered grooves of pulleys, comprising
an elongate and flexibly and compressibly resilient base of rubber-like material and having a tapered transverse shape to be received snugly into and follow the contour of the pulley groove,
an elongate rigid ear on the base and extending outwardly therefrom to engage and manipulate a V-belt, the ear having a rigid mounting clip embracing the exterior of the elongate base and affixed thereto, the clip having a transversely tapered shape conforming to and following the tapered transverse shape of the base to lie flush against the pulley at both sides of the tapered groove of the pulley and minimize tipping of the ear relative to the pulley,
and a second ear also extending outwardly from the base and affixed to the rigid clip, the two ears confronting each other adjacent opposite sides of the base and diverging from each other in a direction away from the base to extend outwardly and to the opposite sides of the pulley.

4. A V-belt manipulating tool for use with tapered grooves of pulleys, comprising
an elongate and flexibly and compressibly resilient base of rubber-like material and having a tapered transverse shape to be received snugly into and follow the contour of the pulley groove,
and the tapered transverse shape of the base defining an inner apex side to lie adjacent the bottom of the pulley groove, and
an elongate rigid ear on the base and extending outwardly therefrom to engage and manipulate a V-belt, the ear having a rigid mounting clip embracing the exterior of the elongate base and affixed thereto, the clip having a transversely tapered shape conforming to and following the tapered transverse shape of the base to lie flush against the pulley at both sides of the tapered groove of the pulley and minimize tipping of the ear relative to the pulley, the clip having an apex inner edge extending longitudinally of the elongate base, the clip having a notch formed adjacent one end of the inner edge whereby to prefix a bend in the base adjacent the clip.

5. A V-belt removing tool for use with grooved pulleys, comprising
an upright and stiff lug to be located in superposed relation to the pulley groove and having a smooth camming face to guide the belt thereacross, and
an elongate and flexibly resilient base of rubber-like material underlying and extending endwise from said lug and affixed to the lug, the base having a tapered transverse shape to be received snugly into and follow the contour of the pulley groove, the base extending obliquely of and at an acute angle with the smooth camming face of the lug, whereby to guide the belt off to the side of the pulley as the pulley is revolved.

6. The V-belt removing tool according to claim 5 and the lug defining a downwardly facing ledge adjacent the base but extending transversely beyond the side thereof to engage the flange of the pulley adjacent the groove and support the lug from the flange.

7. The V-belt removing tool according to claim 5 and the lug being formed integrally of and in one piece with the base of stiff rubber-like material, portions of the lug extending transversely across the full width of the base, and the lug having a smooth metal plate defining the camming face.

8. A V-belt removing tool according to claim 5 and said elongate base having a rigid and non-compressible fitting affixed thereon and spaced from the lug and substantially conforming to the shape of the base to lift the belt to be guided along the lug to the side of the pulley.

9. A V-belt removing tool for use with grooved pulleys, comprising
 an upright and stiff lug to be located in superposed relation to the pulley groove and having a smooth camming face to guide the belt thereacross,
 an elongate and flexibly resilient base of rubber-like material underlying and extending endwise from said lug and affixed to the lug, the base having a tapered transverse shape to be received snugly into and follow the contour of the pulley groove, the base extending obliquely of and at an acute angle with the smooth camming face of the lug, whereby to guide the belt off to the side of the pulley as the pulley is revolved,
 said elongate base having a rigid and non-compressible fitting affixed thereon and spaced from the lug and substantially conforming to the shape of the base to lift the belt to be guided along the lug to the side of the pulley, the fitting being a metal clip embracing the base, and the rubber-like base extending endwise in both directions from the clip.

10. A V-belt removing tool for use with grooved pulleys, comprising
 an upright and stiff lug to be located in superposed relation to the pulley groove and having a smooth camming face to guide the belt thereacross,
 an elongate and flexibly resilient base of rubber-like material underlying and extending endwise from said lug and affixed to the lug, the base having a tapered transverse shape to be received snugly into and follow the contour of the pulley groove, the base extending obliquely of and at an acute angle with the smooth camming face of the lug, whereby to guide the belt off to the side of the pulley as the pulley is revolved,
 said elongate base having a rigid and non-compressible fitting affixed thereon and spaced from the lug and substantially conforming to the shape of the base to lift the belt to be guided along the lug to the side of the pulley,
 and a rigid upright ear on the fitting adjacent the side of the base to engage the belt lifted out of the pulley groove and over the fitting.

11. The V-belt removing tool according to claim 10 and a second rigid upright ear affixed on the fitting and confronting the other ear at the opposite side of the base, the ears confining the belt therebetween.

12. A V-belt applying and removing tool for use with tapered grooves of pulleys, comprising
 an elongate and flexibly resilient base of rubber-like material and having a tapered transverse shape to be received snugly into and follow the contour of the pulley groove,
 a rigid ear projecting transversely outwardly from the elongate base and affixed thereto, and
 a substantially rigid lug affixed in upright position on the base and being spaced longitudinally along the elongate base from said rigid ear, and the lug having a camming face oriented obliquely of and at an acute angle to the elongate base, the camming face obliquely confronting the rigid ear.

13. The V-belt applying and removing tool according to claim 12 and the lug and camming face being disposed in superposed position relative to the elongate base, and the ear projecting obliquely outwardly and to one side of the base to extend beyond the side of the pulley.

14. A V-belt manipulating tool for applying V-belts to and removing V-belts from the tapered grooves of pulleys, comprising
 an elongate and flexibly and compressibly resilient base of rubber-like material and having a tapered transverse shape to be received snugly into and follow the contour of the pulley groove, the base having an inner side to lie at the bottom of the pulley groove and an outer side to be disposed adjacent the peripheral edge of the pulley flanges adjacent the groove,
 a rigid mounting clip embracing the exterior of the elongate base and affixed thereto, the clip being disposed intermediate the ends of the base whereby the base extends endwise in both directions from the clip, the clip having a transversely tapered shape conforming to and following the tapered transverse shape of the base to lie flush against the pulley at both sides of the tapered groove of the pulley and minimize tipping of the clip and base relative to the pulley,
 a pair of elongate rigid upright ears affixed on the clip and extending outwardly therefrom in confronting relation to each other, the ears diverging from each other in a direction away from the clip and extending obliquely outwardly in opposite directions whereby both ears extend beyond the sides of the pulley when the base is in the groove thereof,
 an upright and substantially rigid lug located in superposed relation to the elongate base, the lug being formed integrally of and in one piece with said base of rubber-like material, the lug extending outwardly from the base a distance not less than approximately twice the depth of the base between the inner and outer sides thereof, and the lug having an elongate shape extending longitudinally along the base, one longitudinal side of the lug being substantially flush with the adjacent side of the base, the opposite side of the lug being oriented obliquely of and at an acute angle with the base and defining an oblique camming face obliquely confronting the clip and ears, said oblique camming face having a forward portion located intermediate the width of the base and having a rear portion located transversely of and to one side of the base, the lug defining a ledge located beneath the rear portion of said camming face to bear inwardly against the edge of the pulley flange, and
 a smooth metal bearing plate overlying and affixed to said camming face to smoothly guide the side of the belt therealong.

\* \* \* \* \*